United States Patent Office 3,528,975
Patented Sept. 15, 1970

3,528,975
3,9 - BIS(SUBSTITUTED AMINO) - 2,4,8,10 - TETRA-
OXA - 3,9 - DIPHOSPHASPIRO[5.5]UNDECANE-
3,9-DIOXIDES AND DISULFIDES
Philip M. Pivawer and Rudi F. W. Ratz, Hamden, Conn.,
  assignors to Olin Mathieson Chemical Corporation, a
  corporation of Virginia
No Drawing. Filed July 20, 1967, Ser. No. 654,698
  Int. Cl. C07d 87/42
U.S. Cl. 260—246                                    17 Claims

ABSTRACT OF THE DISCLOSURE

A series of bifunctional ureas and carbamates containing a spirane system have been provided by the reaction of 3,9 - bis(isothiocyanato)-2,4,8,10 - tetraoxa - 3,9-diphosphaspiro[5.5]undecane - 3,9 - dioxide; 3,9 - diisocyanato - 2,4,8,10 - tetraoxa - 3,9 - diphosphaspiro[5.5]undecane-3,9-dioxide and their corresponding -3,9-disulfides with ammonia and selected alcohols and amines. These new compounds are useful as anti-oxidants for synthetic resins. They are also valuable agricultural chemicals and motor fuel additives.

---

This invention relates to bifunctional ureas and carbamates and more particularly to spiro ureas and carbamates having the following general formula

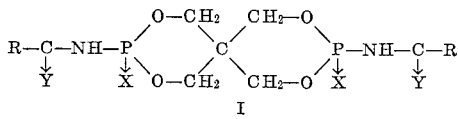

I wherein X is oxygen or sulfur, Y is oxygen or sulfur and R is an alkoxy, amino, alkylamino, dialkylamino, arylamino, substituted arylamino or heterocyclic amino moiety.

The primary object of this invention is to provide bifunctional ureas and carbamates containing a spirane system with phosphorus atoms in both rings and further characterized by the presence of nitrogen bound to each ring phosphorus atom.

Another object of this invention is to provide organic ureas and carbamates suitable for use as anti-oxidants for various resins.

Still another object of this invention is to prepare bifunctional ureas and carbamates having utility as agricultural chemicals.

Other objects of this invention will be apparent hereinafter.

The foregoing objects have been accomplished in accordance with this invention wherein it has been found that bifunctional ureas and carbamates having the Formula I are provided by the reaction of selected isocyanates and isothiocyanates with ammonia, amines and alcohols.

The isothiocyanates suitable for use in the preparation of the compounds of this invention are bifunctional compounds having the formula

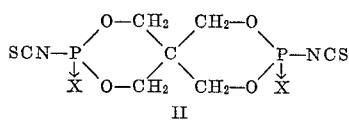

II wherein X is as previously described. These compounds and their method of preparation are fully described in U.S. Pat. 3,090,800. Where X is oxygen in the above formula, the correct chemical name for this bis-isothiocyanate in accordance with Chemical Abstracts usage is 3,9 - bis(isothiocyanato) - 2,4,8,10 - tetraoxa - 3,9 - diphosphaspiro[5.5]undecane - 3, 9 - dioxide, while the corresponding disulfide having the above formula wherein X is sulfur is named 3,9 - bis(isothiocyanato) - 2,4,8,10-tetraoxa-3,9-diphosphaspiro[5.5]undecane-3,9-disulfide.

Bifunctional isocyanates having the formula

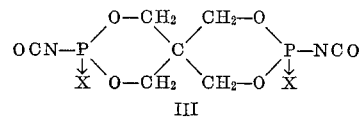

III wherein X is as previously described are also employed as reactants in preparing the compounds of this invention. A copending application of the present inventors, S.N. 475,252, now U.S. Pat. 3,381,061, fully discloses the preparation of these isocyanates and is hereby incorporated in its entirety herein. Where X is oxygen in the above formula, the correct chemical name for the compound is 3,9 - diisocyanato - 2,4,8,10 - tetraoxa - 3,9 - diphosphaspiro[5.5]undecane - 3,9 - dioxide, whereas the corresponding -3,9-disulfide has the above formula where X is sulfur.

Bifunctional spiro carbamates having the Formula I where R is alkoxy are prepared by the reaction of an aliphatic alcohol with one of the previously described isocyanates or isothiocyanates. Illustrative aliphatic alcohols which can be suitably employed in the preparation of these carbamates include methanol, ethanol, β-chloroethanol, propanol, iso-propanol, butanol, iso-butanol, tert-butanol, pentanol, iso-pentanol, n-hexanol, n-octanol, 2-ethyl-hexanol, n-decanol, n-dodecanol, n-hexadecanol, n-octadecanol, β-N,N-dimethylamino-ethanol, etc. However, it is preferred to employ lower aliphatic alcohols, i.e. 1–4 carbon atoms, in preparing the carbamates of this invention.

By reacting the previously described isocyanates and isothiocyanates with ammonia or amines, the bifunctional ureas having the Formula I are provided. While any primary or secondary amine which would provide the ureas having the Formula I can be suitably employed, preferred embodiments utilize aliphatic amines, aniline, nitroanilines, haloanilines and morpholine.

Exemplificative aliphatic amines include methylamine, dimethylamine, ethylamine, diethylamine, propylamine, dipropylamine, iso-propylamine, di-iso-propylamine, butylamine, dibutylamine, n-hexylamine, di-n-hexylamine, n-octylamine, octadecylamine, dioctadecylamine, hexadecylamine, dihexadecylamine, etc. Preferably, lower aliphatic amines, that is amines having 1–4 carbon atoms, are employed.

Suitable nitroanilines include 4-nitroaniline; 2,4-dinitroaniline; 2,4-dinitromethylaniline; 2,5-dinitroaniline; 2,6-dinitroaniline; 3,5-dinitroaniline; 2,4,6-trinitroaniline; 2,4,6-trinitromethylaniline; 2,3,4,6-tetranitroaniline; pentanitroalinine; 3-nitro-2-aminotoluene; 5-nitro-2-aminotoluene; 4-nitro-2-aminotoluene; 2-nitro-4-aminotoluene; 6-nitro-3-aminotoluene; 3-nitro-4-aminotoluene; 2,6-dinitro-4-aminotoluene; 4,6-dinitro-2-aminotoluene; 5-nitro-4-amino-o-xylene; 3-nitro-4-amino-o-xylene; 6 - nitro-4-amino-m-xylene; 5-nitro-4-amino-m-xylene; 4 - nitro-2-amino-m-xylene; 5-nitro-2-amino-p-xylene; p-nitrosoaniline and p-nitrosomethylaniline.

Illustrative of the haloanilines which can be suitably employed in preparing the ureas I are 3,4 - dichloroaniline; o - chloroaniline; m - chloroaniline; p - chloroaniline; 2,4,6 - trichloroaniline; pentachloroaniline; o-fluoroaniline; m - fluoroaniline; p - fluoroaniline; o - chloroaniline; m - chloroaniline; p - chloroaniline; o - bromoaniline; m - bromoaniline; p - bromoaniline; o - iodoaniline: m - iodoaniline; p - iodoaniline; 2,3 - dichloroaniline; 2,3-dibromoaniline; 2,4 - difluoroaniline; 2,4 - dichloroaniline; 2,4 - dibromoaniline; 2,5 - difluoroaniline; 2,5 - dichloroaniline; 2,5 - dibromoaniline; 2,6 - dichloroaniline; 2,6-dibromoaniline; 3,4 - dichloroaniline; 3,4 - dibromoaniline; 3,5 - dichloroaniline; 3,5 - dibromoaniline; 2,3,4-trichloroaniline; 2,3,4 - tribromoaniline; 2,3,5 - trichloroaniline; 2,3,5 - tribromoaniline; 2,3,5 - triiodoaniline; 2,3,6 - trichloroaniline; 2,3,6 - triiodoaniline; 2,4,5 - trichloroaniline; 2,4,5 - tribromoaniline; 2,4,5 - triiodoaniline; 2,4,6 - trichloroaniline; 2,4,6 - tribromoaniline; 2,4,6-triiodoaniline; 3,4,5 - trichloroaniline; 3,4,5 - tribromoaniline; 3,4,5 - triiodoaniline; 2,3,4,5 - tetrachloroaniline; 2,3,4,5 - tetrabromoaniline; 2,3,4,6 - tetrachloroaniline; 2,3,4,6 - tetrabromoaniline; 2,3,4,6 - tetraiodoaniline; 2,3,5,6 - tetrachloroaniline; 2,3,5,6 - tetrabromoaniline; 2,3,4,5,6 - pentachloroaniline; 2,3,4,5,6 - pentabromoaniline; 2 - chloro - N - methylaniline; 3 - chloro-N-methylaniline; 4 - chloro-N-methylaniline; 2,4-dichloro-N-methylaniline; 2,4,6 - trichloro - N - methylaniline; 2 - bromo-N - methylaniline; 4 - bromo - N - methylaniline; 2,4-dibromo-N-methylaniline and 2,4,6-tribromo-N-methylaniline.

The ureas and carbamates I are prepared by reacting the previously-described isocyanates and thioisocyanates with ammonia, amines and alcohols at a temperature between about —40 and 180° C., and preferably from about —20 and 80° C. While these reactions proceed in the absence of any solvent, inert diluents such as ether, petroleum ether, benzene, toluene, acetone, methyl ethyl ketone, cyclohexane, etc. can be suitably employed. Upon completion of the reaction, the solid ureas and carbamates are conveniently isolated by any conventional technique, such as filtration, recrystallization, acidification of the reaction mixture followed by filtration, and the like.

The compounds of this invention are valuable antioxidants. Thus, they have been found to be particularly effective in inhibiting oxidation of various synthetic resins. For example, powdered polypropylene containing one percent by weight of the diacetone complex of 3,9-bis(N-phenylureylene) - 2,4,8,10 - tetraoxa - 3,9 - diphosphaspiro [5.5] undecane - 3,9 - disulfide absorbed a minimum amount of oxygen when maintained under oxygen at 120° C. for an extended period. Similar tests employing 3,9 - bis(ureido) - 2,4,8,10 - tetraoxa - 3,9 - diphosphaspiro [5.5] undecane - 3,9 - disulfide; 3,9 - bis[N-(3,4-dichlorophenyl)ureylene] - 2,4,8,10 - tetraoxa - 3,9 - diphosphaspiro [5.5] undecane - 3,9 - dioxide; 3,9 - bis(4-morpholinocarbonyl amino) - 2,4,8,10 - tetraoxa - 3,9-diphosphaspiro [5.5] undecane - 3,9 - dioxide and 3,9-bis(methoxycarbonyl amino) - 2,4,8,10 - tetraoxa - 3,9-diphosphaspiro [5.5] undecane - 3,9 - disulfide proved that these compounds also exhibited anti-oxidant properties.

These compounds are also valuable agricultural chemicals. For example, it has been found that they are effective insecticides for a variety of insects. Thus, 3,9-bis (N-phenylureylene) - 2,4,8,10 - tetraoxa - 3,9 - diphosphaspiro [5.5] undecane - 3,9 - disulfide and 3,9 - bis(N-dimethylthioureido) - 2,4,8,10 - tetraoxa - 3,9 - diphosphaspiro [5.5] undecane - 3,9 - disulfide were effective in killing the boll weevil, while the former compound was also useful in controlling the Mexican bean beetle.

Furthermore, the compounds of this invention are valuable motor fuel additives. For example, the ureas and carbamates I are added to gasoline to suppress surface ignition thereof and to reduce spark-plug fouling in internal combustion engines.

The following examples will serve to illustrate the preparation of various ureas and carbamates represented by the Formula I.

EXAMPLE 1

Finely powdered 3,9 - diisocyanato - 2,4,8,10 - tetraoxa - 3,9 - diphosphaspiro [5.5] undecane - 3,9 - dioxide (4.0 g.) was added in five equal portions to a large excess of liquid ammonia. The mixture was allowed to stand overnight during which period the excess ammonia evaporated, leaving in the reaction flask 5.05 g. of a dry, white, water-soluble powder having a faint odor of ammonia. Storage for 48 hours over phosphorus pentoxide, with pumping, removed further amounts of ammonia from the powder, reducing its weight to 4.5 g., and causing it to become water-insoluble. Melting point determination revealed decomposition with gas evolution in the range of 145–180° C. The entire amount of 4.5 g. was dissolved in cold 2 percent aqueous potassium hydroxide and the solution was then filtered. Acetic acid was added dropwise to the clear filtrate until it became acidic (pH 6.0). Upon standing at room temperature, a crystalline solid separated from the acidified filtrate. This solid was collected on a Buchner funnel and dried to provide 3.6 g. of product, M.P. 257° C. (dec.). The following analytical data revealed that 3,9 - bis(ureido) - 2,4,8,10 - tetraoxa-3,9 - diphosphaspiro [5.5] undecane - 3,9 - dioxide had been obtained.

*Analysis.*—Calc'd for $C_7H_{14}N_4O_8P_2$ (percent): C, 24.43; H, 4.10; N, 16.28; P, 17.99. Found (percent): C, 23.62, 23.57; H, 4.05, 4.07; N, 15.94, 15.84; P, 17.49, 17.45.

EXAMPLE 2

3,9 - diisocyanato - 2,4,8,10 - tetraoxa - 3,9 - diphosphaspiro [5.5] undecane - 3,9 - dioxide (3.10 g.) was dissolved in 25 ml. of butylamine and the resulting solution stirred for two days. The excess butylamine was evaporated from the reaction mixture, leaving a gummy solid in the reaction vessel. This solid was dissolved in water and acidified with a 10 percent hydrochloric acid solution, thereby causing a precipitate to form. The mixture was filtered and the precipitate washed with water and dried to provide 3.7 g. of a solid material. Recrystallization from a water-acetone solution provided 2.4 g. of a complex which was broken up by heating in vacuo at 80° C./0.5 mm. Hg, thereby providing a solid product having a melting point of 128–136° C. (dec.). The following analytical data revealed that 3,9 - bis(N - butylureylene) - 2,4,8,10 - tetraoxa - 3,9 - diphosphaspiro [5.5] undecane-3,9 - dioxide had been obtained.

*Analysis.*—Calc'd for $C_{15}H_{30}N_4O_8P_2$ (percent): C, 39.48; H, 6.63; N, 12.28; P, 13.57. Found (percent): C, 39.58, 39.23; H, 6.54, 6.63; N, 12.34, 12.26; P, 13.46, 13.62.

EXAMPLE 3

The amount of 6.2 g. of 3,9-diisocyanato-2,4,8,10-tetraoxa - 3,9 - diphosphaspiro [5.5] undecane - 3,9 - dioxide was added to 30 ml. of aniline, providing a product which became gummy upon standing. After one hour, 150 ml. of ether was added to the reaction mixture, thereby causing a white precipitate to form. After stirring for four days, the mixture was filtered and the precipitate washed with ether and dried to provide 11.29 g. of solid material. A portion of this solid material (9.0 g.) was dissolved in dilute sodium hydrochloride and reacidified with a 10 percent hydrochloric acid solution. After filtration, the solid was washed with warm ethanol and dried to provide 4.0 g. of product, M.P. 182–185° C. (dec.). The following analytical data revealed that 3,9-bis(N-phenylureylene)-2,4,8,10 - tetraoxa - 3,9 - diphosphaspiro [5.5] undecane-3,9-dioxide had been obtained.

*Analysis.*—Calcd. for $C_{19}H_{22}N_4O_8P_2$ (percent): C, 45.97; H, 4.44; N, 11.29; P, 12.50. Found (percent): C, 45.95; H, 4.48; N, 11.29; P, 12.40.

EXAMPLE 4

A solution of 4.4 g. of 3,4-dichloroaniline in 25 ml. of anhydrous ether was added to a suspension of 4.2 g. of finely powdered 3,9 - diisocyanato - 2,4,8,10 - tetraoxa-3,9 - diphosphaspiro [5.5] undecane - 3,9 - dioxide in 25 ml. of anhydrous ether. A solid having a slight purple color on its surface formed. After stirring for five days, the mixture was filtered to provide 7.8 g. of lavender powder, which was purified by extraction with boiling water to provide a solid having a melting point of 230–234° C. (dec.). The following analytical data revealed that 3,9 - bis[N - (3,4 - dichlorophenyl)ureylene] - 2,4,8,10 - tetraoxa - 3,9 - diphosphaspiro [5.5] undecane - 3,9-dioxide had been obtained.

Analysis.—Calcd. for $C_{19}H_{18}Cl_4N_4O_8P_2$ (percent): C, 35.98; H, 2.86; Cl, 22.36; N, 8.84; P, 9.77. Found (percent): C, 35.55; H, 3.14; Cl, 22.40; N, 8.91; P, 10.08.

EXAMPLE 5

3,9 - diisocyanato - 2,4,8,10 - tetraoxa - 3,9 - diphosphaspiro [5.5] undecane - 3,9 - dioxide (6.2 g.) was added to 50 ml. of morpholine and the resulting mixture was stirred for four days. Upon the addition of 200 ml. of ether, a precipitate separated from the reaction mixture. Filtration and drying provided 13.5 g. of solid material. A portion of this solid (10.0 g.) was dissolved in water and acidified with 20 percent hydrochloric acid solution. The addition of a large excess of acetone caused a precipitate to separate from the acidified solution. After filtration, the precipitate was washed successively with cold water and acetone and then dried to provide 2.0 g. of product, M.P. 230–233° C. (dec.). The following analytical data revealed that 3,9 - bis(4 - morpholinocarbonyl amino) - 2,4,8,10 - tetraoxa - 3,9 - diphosphaspiro [5.5] undecane-3,9-dioxide had been obtained.

Analysis.—Calcd. for $C_{15}H_{26}N_4O_{10}P_2$ (percent): C, 37.20; H, 5.41; N, 11.57; P, 12.79. Found (percent): C, 36.81; H, 5.39; N, 11.51; P, 12.91.

EXAMPLE 6

The amount of 10.0 g. of finely powdered 3,9-diisocyanato - 2,4,8,10 - tetraoxa - 3,9 - diphosphaspiro [5.5] undecane-3,9-dioxide was mixed with 50 ml. of anhydrous methanol. An exothermic but readily controllable reaction occurred immediately. The suspension was stirred at room temperature for sixty hours and then filtered to provide 11.4 g. of colorless crystal powder, M.P. 247–249° C. (dec.). The following analytical data revealed that 3,9-bis(N - methoxycarbonyl amino) - 2,4,8,10 - tetraoxa-3,9 - diphosphaspiro [5.5] undecane - 3,9 - dioxide had been obtained.

Analysis.—Calcd. for $C_9H_{16}N_2O_{10}P_2$ (percent): C, 28.89; H, 4.31; N, 7.49; P, 16.55. Found (percent): C, 28.55, 28.54; H, 4.62, 4.62; N, 7.22; P, 16.06, 15.80.

EXAMPLE 7

3,9 - diisocyanato - 2,4,8,10 - tetraoxa - 3,9 - diphosphaspiro [5.5] undecane - 3,9 - disulfide (4.0 g.) was added to 200 ml. of absolute methanol. The mixture was heated to 35° C., stirred for sixteen hours and then filtered to provide 3.2 g. of solid product. Evaporation of the filtrate provided an additional quantity of crude product in the amount of 0.8 g. Recrystallization of the combined solids from hot methanol yielded 2.0 g. of product, M.P. 218.5–220° C. (dec.). The following analytical data revealed that 3,9 - bis(methoxycarbonyl amino) - 2,4,8,10-tetraoxa - 3,9 - diphosphaspiro [5.5] undecane - 3,9 - disulfide had been obtained.

Analysis.—Calcd. for $C_9H_{16}N_2O_8P_2S_2$ (percent): C, 26.60; H, 3.92; P, 15.27; S, 15.76. Found (percent): C, 26.64; H, 3.93; P, 15.47; S, 15.34.

EXAMPLE 8

The amount of 3.42 g. of 3,9-diisocyanato-2,4,8,10-tetraoxa - 3,9 - diphosphaspiro [5.5] undecane - 3,9 - disulfide was added to a large excess of anhydrous ammonia. A sticky material formed immediately, and was then dispersed by the addition of 50 ml. of ether to the mixture. After stirring for twenty-four hours, the mixture was filtered to provide 4.1 g. of a solid material. This solid was dissolved in 25 ml. of water and acidified with dilute hydrochloride acid. The resulting precipitate was collected and dried to provide 3.6 g. of product, which was washed with hot methanol to provide a pure product having a melting point of 203–208° C. The following analytical data revealed that 3,9 - bis(ureido) - 2,4,8,10 - tetraoxa-3,9 - diphosphaspiro [5.5] undecane - 3,9 - disulfide had been obtained in 98 percent yield.

Analysis.—Calcd. for $C_7H_{14}N_4O_6P_2S_2$ (percent): C, 22.34; H, 3.72; N, 14.89; P, 16.49; S, 17.02. Found (percent): C, 22.51; H, 4.01; N, 15.16; P, 16.18; S, 17.03.

EXAMPLE 9

3,9 - diisocyanato - 2,4,8,10 - tetraoxa - 3,9 - diphosphaspiro [5.5] undecane - 3,9 - disulfide (3.42 g.) was added to a solution of 1.86 g. of aniline in 50 ml. of xylene at a temperature of 50° C. After completion of the addition, the mixture was cooled slowly to room temperature and then stirred for twenty-four hours. Filtration of the reaction mixture provided 5.2 g. of solid, M.P. 207–210° C., which was recrystallized from hot acetone to provide 2.3 g. of pure product, M.P. 200–204° C. (dec.). The following analytical data revealed that 3,9-bis(N-phenylureylene) - 2,4,8,10 - tetraoxa - 3,9 - diphosphaspiro [5.5] undecane-3,9-disulfide, diacetone complex had been obtained.

Analysis.—Calc'd for $C_{25}H_{34}N_4O_8P_2S_2$ (percent): C, 46.58; H, 5.32; N, 8.70; P, 9.61; S, 9.95. Found (percent): C, 46.75; H, 5.43; N, 8.51; P, 9.82; S, 10.13.

EXAMPLE 10

Gaseous ammonia (approximately 50.0 g.) was condensed by means of a Dry Ice-acetone bath into a 3-necked round bottom flask. To this was added, in five equal portions, with stirring, the amount of 3.0 g. of 3,9-bis-isothiocyanato-2,4,8,10-tetraoxa - 3,9 - diphosphaspiro[5.5] undecane-3,9-disulfide. After the addition was completed, the Dry Ice-acetone bath was removed and the excess ammonia was allowed to evaporate, with stirring, for over a period of two hours. At the end of this period, a slightly yellowish crystalline solid remained in the reaction flask. This solid was washed with ether to provide 3.53 g. of crystals which were dissolved in water. After charcoaling the slightly yellowish aqueous solution, glacial acetic acid was added dropwise, thereby causing a precipitate to separate from the solution. Filtration and vacuum drying provided 3.2 g. of white crystals, M.P. 173° C. (dec.). The following analytical data revealed that 3,9-bis(thioureido)-2,4,8,10-tetraoxa - 3,9 - diphosphaspiro[5.5]undecane-3, 9-disulfide had been obtained in 98 percent yield.

Analysis.—Calc'd for $C_7H_{14}N_4O_4P_2S_4$ (percent): C, 20.58; H, 3.46; N, 13.72; P, 15.17; S, 31.40. Found (percent): C, 20.09; H, 3.74; N, 13.16; P, 15.03; S, 30.35.

EXAMPLE 11

Dimethylamine (approximately 25 g.) was condensed in a 3-necked round bottom flask by means of Dry Ice powder. 3,9-bis-isothiocyanato - 2,4,8,10 - tetraoxa - 3,9-diphosphaspiro[5.5]undecane-3,9-disulfide (3.0 g.) was added in six portions with stirring to the dimethylamine. At the end of the addition period, two layers had formed in the reaction flask. Continuous stirring at room temperature with slow evaporation provided a white solid product, which was dissolved in 50 ml. of water. Glacial acetic acid was added dropwise, with stirring to the aqueous solution, thereby causing a precipitate to form. This precipitate was collected on a Buchner funnel and stored over phosphorus pentoxide in vacuo for twenty-four hours, thereby providing 3.8 g. of product. Recrystallization from chloroform provided a pure product having a melting point of 165.5–166° C. The following analytical data revealed that 3,9-bis(N,N-dimethylthioureido)-2,4, 8,10-tetraoxa - 3,9 - diphosphaspiro[5.5]undecane - 3,9-disulfide had been obtained in 98.3 percent yield.

Analysis.—Calc'd for $C_{11}H_{22}N_4O_4P_2S_4$ (percent): C, 28.44; H, 4.77; N, 12.06; P, 13.34; S, 27.61. Found (percent: C, 28.24; H, 4.81; N, 11.98; P, 13.02; S, 27.14.

EXAMPLE 12

3,9-bis-isothiocyanato - 2,4,8,10 - tetraoxa - 3,9 - diphosphaspiro[5.5]undecane-3,9-disulfide (3.0 g.) was added, with stirring in five equal portions, to 15.5 g. of aniline. An exothermic but readily controllable reaction occurred during the addition. After allowing the mixture to stand for three hours, 150 ml. of ether was added, causing a precipitate to separate from the reaction mixture. This precipitate was collected on a Buchner funnel and dried to provide 3.4 g. of powdery solid, M.P. 156° C. The following analytical data revealed that 3,9-bis(N-phenylthioureido) - 2,4,8,10 - tetraoxa - 3,9 - diphosphaspiro[5.5]undecane-3,9-disulfide had been obtained.

*Analysis.*—Calc'd for $C_{19}H_{22}N_4O_4P_2S_4$ (percent): C, 40.71; H, 3.96; N, 9.99; P, 11.05; S, 22.88. Found (percent): C, 40.39; H, 4.29; N, 10.01; P, 11.02; S, 22.65.

What is claimed is:

1. A spirane having the formula

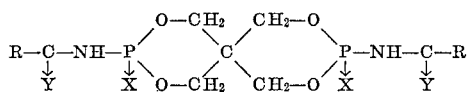

wherein X and Y are oxygen or sulfur and R is amino, phenylamino, halophenylamino, nitrophenylamino, morpholino, alkoxy, alkylamino, or dialkylamino, each alkyl group in said alkoxy, alkylamino and dialkylamino having 1–18 carbon atoms.

2. The spirane of claim 1 wherein R is lower alkoxy.

3. The spirane of claim 2 having the name 3,9-bis(N-methoxycarbonyl amino) - 2,4,8,10 - tetraoxa - 3,9 - diphosphaspiro[5.5]undecane-3,9-dioxide.

4. The spirane of claim 2 having the name 3,9-bis (methoxycarbonyl amino) - 2,4,8,10 - tetraoxa - 3,9 - diphosphaspiro[5.5]undecane-3,9-disulfide.

5. The spirane of claim 1 wherein R is amino.

6. The spirane of claim 5 having the name 3,9-bis(ureido) - 2,4,8,10 - tetraoxa - 3,9 - diphosphaspiro[5.5]undecane-3,9-dioxide.

7. The spirane of claim 5 having the name 3,9 - bis (ureido) - 2,4,8,10 - tetraoxa - 3,9 - diphosphaspiro[5.5] undecane-3,9-disulfide.

8. The spirane of claim 5 having the name 3,9 - bis (thioureido) - 2,4,8,10 - tetraoxa - 3,9 - diphosphaspiro [5.5]undecane-3,9-disulfide.

9. The spirane of claim 1 wherein R is loweralkylamino or lowerdialkylamino.

10. The spirane of claim 9 having the name 3,9 - bis (N-butylureylene) - 2,4,8,10 - tetraoxa - 3,9 - diphosphaspiro[5.5]undecane-3,9-dioxide.

11. The spirane of calim 9 having the name 3,9 - bis (N-dimethylthioureido) - 2,4,8,10 - tetraoxa - 3,9 - diphosphaspiro[5.5]undecane-3,9-disulfide.

12. The spirane of claim 1 wherein R is phenylamino, halophenylamino or morpholino.

13. The spirane of claim 12 having the name 3,9 - bis (N-phenylureylene) - 2,4,8,10 - tetraoxa - 3,9 - diphosphaspiro[5.5]undecane-3,9-dioxide.

14. The spirane of claim 12 having the name 3,9 - bis [N-(3,4 - dichlorophenyl)ureylene] - 2,4,8,10 -tetraoxa-3,9-diphosphaspiro[5.5]undecane-3,9-dioxide.

15. The spirane of claim 12 having the name 3,9 - bis (N-phenylureylene) - 2,4,8,10 - tetraoxa - 3,9 - diphosphaspiro[5.5]undecane-3,9-disulfide.

16. The spirane of claim 12 having the name 3,9 - bis (N-phenylthioureido) - 2,4,8,10 - tetraoxa - 3,9 - diphosphaspiro[5.5]undecane-3,9-disulfide.

17. The spirane of claim 12 having the name 3,9 - bis (4-morpholinocarbonyl amino) - 2,4,8,10 - tetraoxa - 3,9-diphosphaspiro[5.5]undecane-3,9-dioxide.

No references cited.

ALEX MAZEL, Primary Examiner

J. TOVAR, Assistant Examiner

U.S. Cl. X.R.

44—63, 71; 260—458, 927; 424—200, 209, 248